(12) United States Patent
Skakunov et al.

(10) Patent No.: US 7,429,312 B2
(45) Date of Patent: Sep. 30, 2008

(54) METHOD FOR PROCESSING MULTI-COMPONENT LIQUID MIXTURES AND DEVICE FOR CARRYING OUT SAID METHOD

(75) Inventors: Yuriy Pavlovich Skakunov, Odessa (UA); Chamil Khakimovich Iskhakov, Moscow (RU); Sergey Vladimirovich Tishkin, Moscow (RU)

(73) Assignee: Energy Savings Technologies Financial Industrial Group LLC, Moscow (RU)

( * ) Notice: Subject to any disclaimer, the term of this patent is extended or adjusted under 35 U.S.C. 154(b) by 433 days.

(21) Appl. No.: 10/500,206

(22) PCT Filed: Dec. 27, 2002

(86) PCT No.: PCT/RU02/00566

§ 371 (c)(1),
(2), (4) Date: Jun. 25, 2004

(87) PCT Pub. No.: WO03/060041

PCT Pub. Date: Jul. 24, 2003

(65) Prior Publication Data

US 2005/0061652 A1     Mar. 24, 2005

(30) Foreign Application Priority Data

Dec. 29, 2001  (UA)  ................. 200200377
Dec. 25, 2002  (UA)  ................. 200300342

(51) Int. Cl.
*B01D 3/10* (2006.01)
*B01D 3/42* (2006.01)
*C10G 7/06* (2006.01)
*F04F 5/54* (2006.01)
*B01D 3/00* (2006.01)

(52) U.S. Cl. ................ 203/2; 196/114; 196/141; 202/160; 202/205; 203/91; 203/DIG. 14; 208/357; 208/366; 417/151

(58) Field of Classification Search ................. 196/114, 196/132, 126, 127, 141; 202/160, 205; 203/2, 203/91, 100, DIG. 14; 208/357, 366; 417/151
See application file for complete search history.

(56) References Cited

U.S. PATENT DOCUMENTS 3,373,089 A     3/1968    Vautrain et al.

(Continued)

FOREIGN PATENT DOCUMENTS

GB       636324 A     4/1950

(Continued)

OTHER PUBLICATIONS

Sokolov et al, "Jet Devices", *Energoatomizdat*, 3-d edition, Moscow, pp. 278-309 (1989) (Translation, pp. 302-306).

*Primary Examiner*—Virginia Manoharan
(74) *Attorney, Agent, or Firm*—Frishauf, Holtz, Goodman & Chick, P.C.

(57) ABSTRACT

The present group of inventions relates to processing of multi-component liquid mixtures (MCLM) employing reforming process, preferably for vacuum distillation of hydrocarbon mixtures and in petroleum refining and chemical industries. The inventions include the method for processing of multi-component liquid mixtures. The method of MCLM separation includes pressure feeding of a hydrocarbon liquid mixture to an a liquid-gas jet device nozzle which discharges to a vacuum chamber of liquid-gas jet device. A counter pressure jointly with the liquid-gas jet device forms a pressure surge in the vacuum chamber. The counter pressure is 0.4 to 0.7 of the magnitude of the feed pressure generated by the pump. The plant for MCLM processing includes a feed pump, a head delivery main, a discharge main, control instrumentation and a vacuum-generating device including a vacuum chamber, a liquid-gas jet device with a nozzle in the front end wall of the vacuum chamber. The length of the nozzle exceeds its diameter by a factor 7 to 10. The plant includes a counter pressure regulator connected through a conduit to the rear end wall of the vacuum chamber.

6 Claims, 1 Drawing Sheet

U.S. PATENT DOCUMENTS

| | | | |
|---|---|---|---|
| 5,944,950 A * | 8/1999 | Olausson et al. | 159/47.3 |
| 5,980,698 A * | 11/1999 | Abrosimov et al. | 203/94 |
| 6,277,247 B1 | 8/2001 | Popov | |
| 6,346,173 B2 * | 2/2002 | Popov et al. | 203/91 |

FOREIGN PATENT DOCUMENTS

| | | |
|---|---|---|
| GB | 2 003 394 A | 3/1979 |
| RU | 2080353 C1 | 5/1997 |
| RU | 2087178 C1 | 8/1997 |
| RU | 2161059 C1 | 12/2000 |
| RU | 2165281 C1 | 4/2001 |
| RU | 2166528 C2 | 5/2001 |
| WO | WO 9605900 A1 | 2/1996 |

* cited by examiner

METHOD FOR PROCESSING MULTI-COMPONENT LIQUID MIXTURES AND DEVICE FOR CARRYING OUT SAID METHOD

This application is the U.S. national phase application of International Application PCT/RU02/00566 filed Dec. 27, 2002.

AREA OF THE INVENTION

The present group of inventions relates to processing of multi-component liquid mixtures employing reforming process, preferably for vacuum distillation of hydrocarbon mixtures and can be applied in petrochemical and chemical industries.

STATE OF THE ART

A known method for processing of petrol fraction comprises its separation into light and heavy fractions, reforming of the light one at elevated temperature and pressure 0.5 to 2 MPa, extraction of products yielding aromatic hydrocarbons and raffinate, mixing raffinate with heavy fraction of the secondary reforming at elevated temperature and pressure 2.0 to 4.0 MPa, yielding high-octane component of motor petrol; at that, firstly a fraction boiling away at temperatures 90-93° C. to 100-103° C. is extracted from the raffinate and mixed with the heavy petrol fraction, after which the remaining raffinate fractions are further fed to mixing with motor petrol component (RU 2080353, IPC C 10 G 59/06, 1997-05-27).

However, this method is featured by enhancement of the cracking reaction, which is due to low selectivity of transformation of hydrocarbons making up the raffinate and to accumulation of poorly-reformable hydrocarbons in the circulating flow.

A known method for processing of multi-component mixture of preferably hydrocarbon composition comprises vacuum feeding of liquid product, resulting in its separation into liquid and gas/vapor phase, evacuation of vapors and gases therefrom with jet suction device with its further separation via condensation into liquid and non-condensed vapor/gas fraction, the latter being further withdrawn for disposal (WO No. 96/05900, IPC B 01 D 3/10, C 10 G 7/06, priority date 1994 Aug. 19).

The drawback of this method is utilization of the condensate from the separator as a working liquid of a jet suction device, resulting in extensive accumulation therein of vapor/gas contaminants, which essentially deteriorates the output product quality and entails additional costs for its after purification.

The closest to the claimed method for multi-component mixtures processing in its technological content is the method of vacuum distillation of hydrocarbon mixtures (crude oil, petrol, etc.), comprising pressure feeding of the incoming liquid mixture into the nozzle of a liquid/gas jet device (hereinafter, a jet device) and discharging said mixture into a vacuum chamber (RU 2087178, IPC C 10 G 7/06, 1997 Aug. 20).

However, this method does not provide sufficiently efficient improvement of the petrol octane number after vacuum distillation of hydrocarbon fluids.

A known plant for processing of hydrocarbon liquid mixtures, for example, vacuum distillation of crude oil, comprises at least a distillery section under over pressure or atmospheric pressure with an oil delivery pipe, a vacuum column, and a vacuum hydrocyclone unit, comprising an jet device, a separator and a pump for working liquid delivery. At that, the liquid inlet of the jet device is connected to the working liquid outlet of the pump, and the gas inlet of the jet device is connected to the main for vapor/gas exhaust from the vacuum column with its outlet connected to the separator. The plant is further equipped with a second jet device with its liquid inlet connected to the crude oil delivery main, and its gas inlet connected to the separator gas outlet, its mixture outlet being connected to the crude oil delivery main, the inlet of the working liquid delivery pump being connected to the outlet of the working liquid from the separator (RU 2161059, IPC C 10 G 7/06, 1999 Jul. 16).

However, this plant is excessively material-intensive.

The closest to the claimed device for multi-component mixtures processing in its technological content is the device for vacuum distillation of multi-component organic mixtures comprising a delivery pump, an evacuating device, a horizontal vacuum chamber, a head delivery main and a discharge main, and control instrumentation (RU 2166528, IPC C 10 G 7/06, 1999 Jun. 29).

The drawback of the above device is its insufficient efficiency related to high material-intensity and excessive power consumption, and in the design aspect, to the layout complexity.

DISCLOSURE OF THE INVENTION

The technological problem, solution of which is the main objective of the present group of inventions, is enhancing the efficiency of multi-component liquid mixture processing and the devices thereto with the purpose of obtaining finished product possessing higher quality.

The solution of said problem according to the claimed method is provided for by the method of processing of multi-component liquid mixtures through vacuum distillation comprising pressure feeding of a hydrocarbon liquid mixture to a jet device nozzle with its further discharging to the vacuum chamber. At that, according to the invention, the incoming liquid mixture is fed to the jet device nozzle under pressure of 1 to 12 MPa; due to boiling up of a part of said liquid mixture a two-phase supersonic flow is generated in the vacuum chamber, after which a counter pressure is applied causing emergence of a pressure surge in the jet device vacuum chamber with avalanche condensation therein of the gaseous component of the two-phase flow.

In the course of the pressure surge, a range of oscillations is generated possessing various physical nature, including ultrasonic, electromagnetic, etc., fostering collapsing of newly formed gas bubbles, which in their turn, originate new oscillation while collapsing, that is, an avalanche process of gas bubbles collapsing occurs generating a strong ultrasonic field, causing transformation of raw liquid mixture components (disintegration, isomerization, etc.).

The solution of the formulated problem according to the second object of the claimed group of inventions is provided for by the plant for multi-component liquid mixtures processing comprising a delivery pump, a head delivery main, a discharge main, control instrumentation and vacuum-generating device comprising a horizontal vacuum chamber. With this, according to the claimed invention, the vacuum-generating device is embodied as a liquid/gas jet device connected to the head main, the nozzle of which is integrated into the front end wall of the vacuum chamber, the latter having the length with respect to its cavity diameter meeting the equation $L = (7 \text{ to } 10) * D$, where:

L is the length of the vacuum chamber,
D is the diameter of the vacuum chamber cavity;

besides, the plant further comprises the counter pressure regulator embodied so as to provide for, jointly with the liquid/gas jet device, conditions for generation of the pressure surge in the vacuum chamber and connected through a pipeline to the rear end wall of the vacuum chamber, and a vacuum gauge connected to the vacuum chamber in the latter's front part.

In the preferred embodiment of the plant, the nozzle is embodied with its thickness with respect to its diameter constituting, where:

$$\frac{l_c}{d_c} = 1 \text{ to } 5$$

$l_c$ is the nozzle length which in the embodiment of FIG. 1, is also the thickness of the front end wall (7),
$d_c$ is the nozzle diameter;

besides, connected to the head delivery main between the delivery pump and the exhaust jet device may be a flowmeter, a thermometer, and a pressure gauge.

BRIEF DESCRIPTION OF DRAWINGS

The plant I for hydrocarbon mixture vacuum distillation (cf. FIG. 1) comprises a horizontal vacuum chamber 1, a delivery pump 2, a head delivery main 3 and a discharge main 4, a liquid/gas jet device 5, comprising the horizontal vacuum chamber 1 and a nozzle 6, integrated into the front end wall 7 of the vacuum chamber 1, and a counter pressure regulator 8 connected via a pipeline 9 to the rear end wall 10 of the vacuum chamber 1. A vacuum gauge 11 is connected to the vacuum chamber 1 cavity in its front section.

Figure 1:
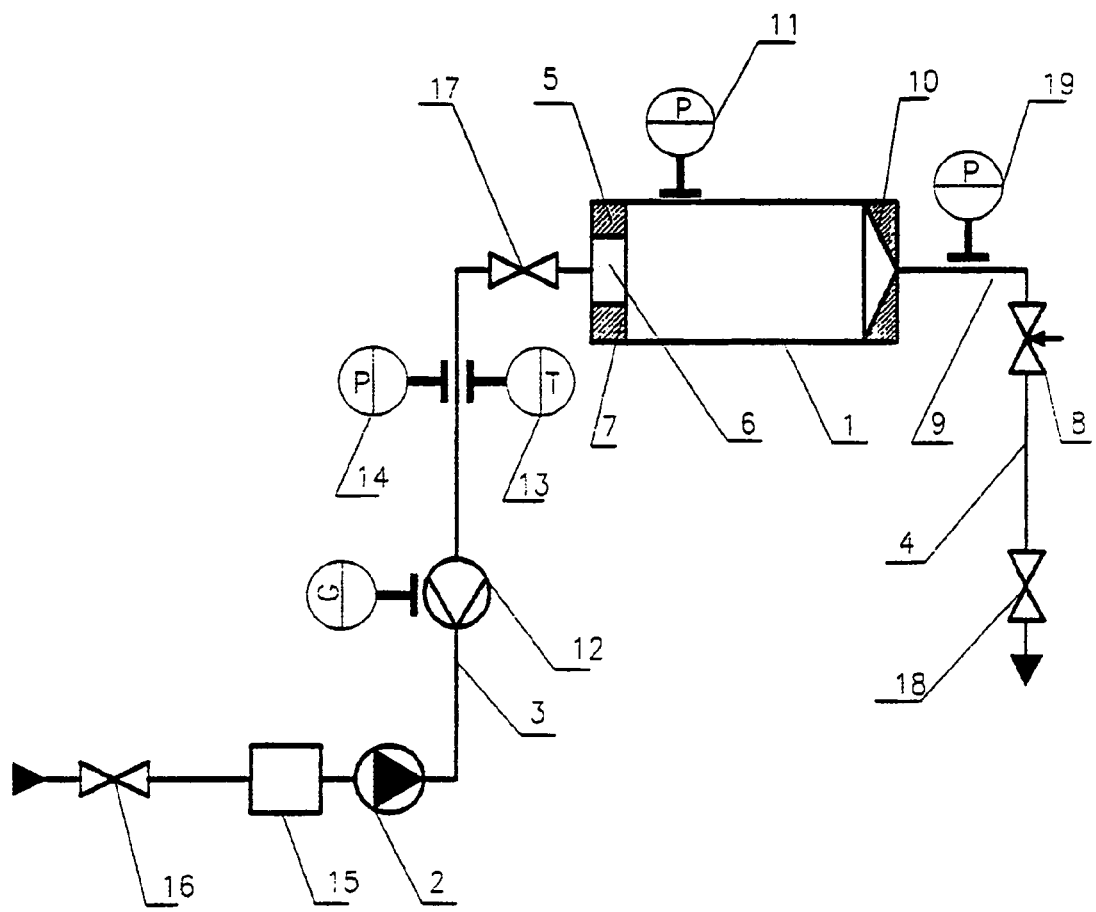
FIG. 1 is a flowchart of the plant I implementing the claimed method of mineral oil processing.

The length L of the vacuum chamber 1 exceeds the diameter D of its cavity by the factor of 7 to 10. With this, the nozzle 6 is preferably embodied with its thickness $l_c$ with respect to its diameter $d_c$ meeting the equation $$\frac{l_c}{d_c} = 1 \text{ to } 5.$$

It is expedient to connect to the head delivery main 3 plant control instrumentation, that is, a flowmeter 12, a thermometer 13 and a pressure gauge 14, between the delivery pump 2 and the jet device 5.

A filter 15 is installed upstream of the delivery pump 2, and delivery and discharge mains are equipped with valves 16, 17, 18. It is also expedient to install a pressure gauge 19 in the pipeline 9 between the counter pressure regulator 8 and the rear end wall 10.

Operation of the plant I is carried out as follows.

The hydrocarbon mixture for reforming is fed via the valve 16 and the filter 15 to the pump 2. The pressure downstream of the pumps is maintained within the limits 2.0 to 2.5 MPa. The pressure gauge 14, the thermometer 13 and flowmeter 12 monitor the pressure, the temperature and the flow rate, respectively, of the raw petrol at the working segment from the delivery pump 2 fo the horizontal vacuum chamber 1. At the startup of the plant operation valves 16, 17 and 18 are open. The required evacuation in the vacuum chamber is monitored with the vacuum gauge 11 connected to the front part of the vacuum chamber.

Said value is determined by the saturation pressure of the low-boiling mixture component. For example, for the petrol this value is 0.005 to 0.07 MPa at temperatures 4 to 80° C. The maximum counter pressure not altering the pressure reading of the vacuum gauge is generated with the counter pressure regulator 8. As a rule, this pressure constitutes 0.4 to 0.7 of the pressure generated by the pump 2.

PREFERRED EMBODIMENT OF THE INVENTION

The claimed group of inventions is further illustrated with the Example 1, which is by no means limiting with respect to the range of actual technologies and devices for their implementation that may be embodied using the claimed inventions.

The Example 1 illustrates the method for processing of multi-component liquid hydrocarbon mixtures and the device for its implementation.

EXAMPLE 1

The raw multi-component hydrocarbon mixture (raw petrol, fuel oil or diesel oil) constituting a single-phase liquid working medium is fed under pressure to the jet device.

This pressure has been found to constitute: for raw petrol processing, 1 to 12 MPa; for fuel oil processing, 10 to 12 MPa; for diesel oil processing. 5 to 6 MPa; for crude oil processing, 4 to 7 MPa.

Due to jet restriction past the output edge of the nozzle 6, which is usually embodied as an aperture (cf FIG. 1), the evacuation is generated equal to the saturation pressure of the incoming mixture low-boiling component at the given temperature.

The average integral value of saturation pressure of the produced low-boiling mixture component, e.g. of refined petrol, varies within the limits of 0.005 to 0.07 MPa and is equal to its saturation pressure at the temperatures 4 to 8.0° C., which entails originating of a gas phase in the jet liftoff area.

Having passed the nozzle 7, the liquid enters in the reduced pressure area and boils up, which causes formation of the two-phase gas/liquid flow possessing uniform concentration of the gas phase over the whole volume of the flow, with said flow further entering the supersonic mode.

The residual pressure in the vacuum chamber is monitored with the vacuum gauge located at the vacuum chamber entrance.

This results in formation of an emulsion with gas bubbles of 0.5 to 7 Mpm size, which essentially. creates the second phase of the working medium.

Following stabilization of the residual pressure in the vacuum chamber, which is monitored by the vacuum gauge, the maximum counter pressure not altering the pressure reading of the vacuum gauge is generated with the counter pressure regulator 8. As a rule, this pressure constitutes 0.4 to 0.7 of the pressure generated by the pump 2.

The counter pressure is monitored by the pressure gauge located at the vacuum chamber outlet.

In the course of the further flow motion along the vacuum chamber channel, the velocity of the flow drops with its pressure rising. The gaseous component of the two-phase flow, in this case, the distilled hydrocarbon, is condensed and further fed to the accumulator tank.

The overall control of the plant operation is carried out basing on the readings of the vacuum gauge and the high pressure gauge. With this, to generate a pressure surge in the vacuum chamber it is expedient to provide the pressure ratio constituting $$\frac{P_2}{P_1} > 15, \text{ where:}$$

$P_1$ is the pressure prior to the surge (reading of the vacuum gauge for the residual pressure);

$P_2$ is the pressure following the surge (reading of the high pressure gauge).

Such pressure surge generation has been found to be feasible provided the ratio of the nozzle cross-section at the output edge level to the vacuum chamber cross-section constituting $$\frac{f}{F} = 0.2 \text{ to } 0.6, \text{ where:}$$

f is the nozzle cross-section,
F is the vacuum chamber cross-section.

The claimed plant in the preferred embodiment comprises a pump (2), a horizontal vacuum chamber (1), the length L of which exceeds the diameter of its cavity D by the factor 7 to 10, and a vacuum-generating device (5) embodied as a liquid/gas jet device with a nozzle (6) integrated into the front end wall (7) of the vacuum chamber (1), with the ratio of the nozzle thickness $l_c$ to its diameter $d_c$ constituting $$\frac{l_c}{d_c} = 1 \text{ to } 5.$$

The claimed plant further comprises a head delivery main (3), a discharge main (4), equipped with valves (16), (17) and (18) and a counter pressure regulator (8) connected via a pipeline (9) to the rear end wall (10) of the vacuum chamber (1).

The plant is further equipped with control instrumentation, namely, a vacuum gauge (11) connected to the vacuum chamber cavity in its front part, a flowmeter (12) a thermometer (13) and a pressure gauge (14) connected to the head delivery main (3) between the delivery pump (2) and the vacuum-generating device (5), and a pressure gauge (19) connected to the pipeline (9) between the counter pressure regulator (8) and the rear end wall (10) of the vacuum chamber (1).

Besides, a filter (15) is installed before the feeding pump (2).

The vacuum chamber and the vacuum chamber nozzle can be embodied out of various dielectric materials, e.g. out of plexiglas.

Application of the claimed invention enables obtaining end products of a higher quality. For example, the petrol octane number is increased in the average by 2 to 4 units.

Octane number (hereinafter, ON) is a conventional index of detonation characteristics of the fuel provided vehicle operation in conditions of boosted heating mode.

The values of ON presented in Tables 1 and 2 below were determined through motor method in compliance with ASTM D 2699-94, ISO 5163-90, D 2700-94 (GOST 511-82, 8226-82).

Mineral oil densities were determined in compliance with ASTM D 4052-91 (GOST 3900-85, GOST R 51069-97).

TABLE 1

Comparison of octane number for raw and distilled virgin petrol

| T °C. | Q [m³/hr] | $P_1$ [MPa] | Octane number Raw petrol | $\rho^{15}$, kg/m³ | Oct. number of distilled petrol |
|---|---|---|---|---|---|
| 17 | 2.4 | 1.05 | 78.4 | 0.735 | 80.0 |
| 17 | 2.4 | 1.05 | 78.4 | 0.735 | 80.0 |
| 15 | 2.4 | 1.05 | 78.4 | 0.734 | 81.0 |
| 17 | 2.4 | 1.05 | 78.4 | 0.734 | 81.4 |
| 15 | 2.4 | 1.05 | 78.4 | 0.734 | 80.6 |
| 14 | 2.4 | 1.05 | 78.4 | 0.735 | 82.5 |
| 14 | 2.4 | 1.05 | 78.4 | 0.734 | 82.5 |
| 14 | 2.4 | 1.05 | 78.4 | 0.734 | 83.5 |
| 13 | 2.4 | 1.05 | 78.4 | 0.734 | 84.0 |

TABLE 2

Comparison of octane number for raw and distilled casing-head petrol

| T °C. | Q [m³/hr] | Oct. number Raw petrol | Oct. number Refined petrol | $\rho^{15}$, kg/m³ |
|---|---|---|---|---|
| 15.7 | 0.290 | 65.7 | — | — |
| 15.7 | 0.290 | 65.7 | — | — |
| 15.9 | 2.400 | 65.7 | 68.3 | 0.7151 |
| 15.0 | 1.714 | 65.7 | — | 0.7150 |
| 15.4 | 1.714 | 65.7 | — | — |
| 15.4 | 2.400 | 65.7 | 67.3 | 0.7155 |
| 15.4 | 2.483 | 65.7 | — | — | where:
$\rho^{15}$ (kg/m³) is the density of the raw petrol at 15° C.;
$P_1$ (MPa) is the pressure of the raw petrol at the inlet of the plant;
Q (m³/hr) is the flow rate of the raw petrol to the plant.

Besides, application of the claimed invention leads to improvements in the composition and the structure of the incoming product, for example, the molecular mass of the heavy oil fraction is reduced, entailing growing of light oil; for instance, output of the fraction up to 360° C. is increased by 3 to 15 percent.

Fractional composition of oil was determined in compliance with ASTM D 86-95, ISO 3405-88 (GOST 2177-99).

In addition, physicochemical parameters of both individual fractions and the last end of the fraction exceeding 360° C. were altered. For example virgin fractions of oil refinery products from West-Siberian and Kolguev oilfields show the following factors shown in Tables 3 and 4:

petrol fractions feature reduction of sulfur content by 9 to 27 percent and increase of the octane number by 0.5 to 0.7;

kerosene fractions feature reduction of sulfur content by 6 to 7 percent and lowering of congelation point by 2° C.;

diesel oil fractions of light and heavy diesel oil feature reduction of sulfur content by 5 to 19 percent and lowering of cloud temperature by 2 to 3° C.

TABLE 3

Comparison of raw (a) and distilled (b) virgin fractions of West-Siberian oilfield raw oil.

| Indices | Petrol fraction (180° C.) | | Kerosene fraction (120-240° C.) | | Diesel oil fraction (180-320° C.) | | Diesel oil fraction (180-360° C.) | |
|---|---|---|---|---|---|---|---|---|
| | a | b | a | b | a | b | a | b |
| | West-Siberian oilfield raw oil | | | | | | | |
| Density $\rho^{20}$, kg/m³ | 745 | 741 | 777 | 774 | 829 | 826 | 848 | 845 |
| ON | 48.7 | 49.4 | — | — | — | — | — | — |
| Sulfur content, % | 0.082 | 0.075 | 0.15 | 0.14 | 0.37 | 0.35 | 0.42 | 0.40 |
| Congelation point, ° C. | — | — | −57 | −59 | — | — | — | — |
| Cloud point, ° C. | — | — | — | — | −32 | −34 | −26 | −28 |

TABLE 4

Comparison of raw (a) and distilled (b) virgin fractions of Kolguev oilfield raw oil.

| Indices | Petrol fraction (180° C.) | | Kerosene fraction (120-240° C.) | | Diesel oil fraction (180-320° C.) | | Diesel oil fraction (180-360° C.) | |
|---|---|---|---|---|---|---|---|---|
| | a | b | a | b | a | b | a | b |
| | Kolguev oilfield raw oil | | | | | | | |
| Density $\rho^{20}$, kg/m³ | — | — | — | — | 803 | 800 | 811 | 808 |
| ON (MM) | 48.8 | 49.3 | — | — | — | — | — | — |
| Sulfur content, % | 0.011 | 0.008 | — | — | 0.062 | 0.05 | 0.07 | 0.06 |
| Cloud point, ° C. | — | — | — | — | −35 | −38 | −28 | −31 |

Sulfur mass content (%) was determined in compliance with ASTM D 1266-91, ASTM D 2622-94, ASTM D 4294-90, ISO 8754-92.

Cloud point (point of crystallization onset) was determined in compliance with GOST 50066-91.

The essence of the method is refrigerating of a fuel sample in a double-walled test-tube equipped with a thermometer and determining of the cloud point without visible formation of crystals.

Congelation point was determined in compliance with GOST 50066-91.

The essence of the method is refrigerating of a fuel sample in a double-walled test-tube equipped with a thermometer and determining of the point of formation of crystals.

TABLE 5

Table of fractional distillation of oil.

| | 0 (Raw oil) | 1 | 2 | 3 | 4 | 5 | 6 | 7 | 8 |
|---|---|---|---|---|---|---|---|---|---|
| | Sample # | | | | | | | | |
| | Density at 20° C., kg/m³ | | | | | | | | |
| | 898 | 900 | 899 | 900 | 900 | 899 | 900 | 900 | 898 |
| | Fractional composition, ° C. | | | | | | | | |
| $T_{ob}$ | 77 | 83 | 64 | 85 | 79 | 67 | 82 | 65 | 71 |
| 10% | 161 | 163 | 158 | 161 | 158 | 159 | 156 | 154 | 158 |
| 20% | 219 | 219 | 217 | 218 | 221 | 218 | 208 | 217 | 215 |
| 30% | 266 | 265 | 264 | 265 | 264 | 264 | 257 | 264 | 262 |
| 40% | 306 | 305 | 302 | 306 | 306 | 304 | 305 | 305 | 303 |
| 50% | 347 | 341 | 338 | 345 | 344 | 340 | 336 | 345 | 340 |
| 60% | | | | | | 355 | 357 | | 359 |
| Yield of fractions up to 180° C., % | 14 | 13 | 14 | 14 | 13 | 13 | 15 | 13 | 14 |

TABLE 5-continued

Table of fractional distillation of oil.

| | Sample # | | | | | | | |
|---|---|---|---|---|---|---|---|---|
| 0 (Raw oil) | 1 | 2 | 3 | 4 | 5 | 6 | 7 | 8 |
| Density at 20° C., kg/m³ | | | | | | | | |
| 898 | 900 | 899 | 900 | 900 | 899 | 900 | 900 | 898 |
| Fractional composition, ° C. | | | | | | | | |

| | 0 (Raw oil) | 1 | 2 | 3 | 4 | 5 | 6 | 7 | 8 |
|---|---|---|---|---|---|---|---|---|---|
| Yield of fractions up to 200° C., % | 17 | 17 | 17 | 17 | 16 | 17 | 18 | 17 | 17 |
| Yield of fractions up to 361° C., % | 56 | 61 | 59 | 56 | 58 | 64 | 62 | 58 | 62 |

$T_{ob}$ being the temperature of boiling onset.

It follows from the data of Table 5 that the process implementation in compliance with the claimed invention entails systematic growth of light fractions yield.

Fuel oil refining using the claimed method enables their refining into light oil fractions.

INDUSTRIAL APPLICABILITY

The inventions are industrially applicable, as they provide for employment of standard commercial industrial equipment and industrial hydrocarbon mixtures produced at mineral oil refinery in petrochemical and chemical industries.

The invention claimed is:

1. A plant for multi-component liquid mixtures processing comprising a feeding pump (2), a head delivery main (3), a discharge main (4), control instrumentation (11, 12, 13, 14, 19) and a vacuum-generating device (5) comprising a horizontal vacuum (1), wherein the vacuum-generating device (5) is implemented as a liquid-gas jet device (1, 5, 6, 7, 10) connected to the head main (3), a nozzle (6) of which is integrated into a front end wall (7) of the vacuum chamber (1), having a length with respect to its cavity diameter meeting the equation $L = (7 \text{ to } 10) * D$, where:

L is the length of the vacuum chamber,
D is the diameter of the vacuum chamber cavity;
the plant further comprises a counter pressure regulator (8) implemented so as to provide for, jointly with the liquid-gas jet device (1 5, 6, 7, 10), formation of a pressure surge in the vacuum cambered and connected through a pipeline to a rear end wall of the vacuum chamber (1), and a vacuum pressure gauge (11) connected to the vacuum chamber (1) in a front section of said vacuum chamber.

2. The plant according to the claim 1, wherein the nozzle (6) has a length with respect to its diameter constituting $$\frac{l_c}{d_c} = 1 \text{ to } 5, \text{ where:}$$

$l_c$ is the nozzle length,
$d_c$ is the nozzle diameter.

3. The plant according to claim 1, wherein additionally connected to the head delivery main (3) between the feeding pump (2), and the liquid-gas jet device (1, 5, 6, 7, 10) are a flowmeter (12), a thermometer (13), and a pressure gauge (14).

4. The plant according to claim 2, wherein additionally connected to the head delivery main (3) between the feeding pump (2) and the liquid-gas jet device (1, 5, 6, 7, 10) are a flowmeter (12), a thermometer (13), and a pressure gauge (14).

5. A method for processing of multi-component liquid mixtures by vacuum distillation comprising pressure feeding a feed hydrocarbon liquid mixture to a nozzle of a liquid-gas jet device which comprises said nozzle and a vacuum chamber, said nozzle discharge into said vacuum chamber, said feed hydrocarbon liquid mixture is pumped to said nozzle at a feed pressure or 1 to 12 Mpa which is generated by pump, wherein due to vaporization of a part of said feed liquid mixture a two-phase supersonic flow is formed in said vacuum chamber, and then a counter presser is generated which causes a pressure surge in said vacuum chamber with avalanche condensation therein of a gaseous component of said two-phase flow, said counter pressure is 0.4 to 0.7 of the magnitude of said pressure generated by said pump.

6. The method of claim 5, wherein said feed hydrocarbon liquid mixture is a liquid petroleum mixture.

* * * * *

UNITED STATES PATENT AND TRADEMARK OFFICE
CERTIFICATE OF CORRECTION

PATENT NO. : 7,429,312 B2  Page 1 of 1
APPLICATION NO. : 10/500206
DATED : September 30, 2008
INVENTOR(S) : Skakunov et al.

It is certified that error appears in the above-identified patent and that said Letters Patent is hereby corrected as shown below:

Column 3, line 55, delete "pumps" and insert -- pump --.

Column 3, line 59, delete "fo" and insert -- of --.

Column 4, line 47, delete "Mpm" and insert -- μm --.

Column 9, line 38 (claim 1), before "(1)" insert -- chamber --.

Column 9, line 52 (claim 1), delete "cambered" and insert -- chamber --.

Column 10, line 45 (claim 5), delete "or" and insert -- of --.

Column 10, line 48 (claim 5), delete "presser" and insert -- pressure --.

Signed and Sealed this

Twenty-fifth Day of August, 2009

David J. Kappos
*Director of the United States Patent and Trademark Office*